March 19, 1968     S. O. TAYLOR     3,373,649

SPLIT FASTENER WITH LOCKING WEDGE

Filed Oct. 22, 1965

INVENTOR
STEADMON O. TAYLOR
BY

ATTORNEY ium of the invention

United States Patent Office 3,373,649
Patented Mar. 19, 1968

3,373,649
SPLIT FASTENER WITH LOCKING WEDGE
Steadmon O. Taylor, Fort Lauderdale, Fla., assignor to Inventions and Invention Consultants, Inc., Chicago, Ill., a corporation of Illinois
Filed Oct. 22, 1965, Ser. No. 501,920
5 Claims. (Cl. 85—79)

ABSTRACT OF THE DISCLOSURE

A cotter including a center wedge located intermediate a pair of cotter halves which are provided at their ends with outwardly projecting shoulders. The center wedge moves longitudinally intermediate the cotter halves from a withdrawn position wherein the cotter is transversely contracted to an inserted position wherein the cotter is transversely expanded. The cotter halves and center wedge are provided with outwardly opening indentations and notches, respectively, which register when the center wedge is in the withdrawn position in the formation of a peripheral groove, and a resilient ring is fitted within the groove for holding the cotter halves and center wedge in the withdrawn position. Nibs are formed on the center wedge which slidably engage longitudinal grooves in the cotter halves so as to preclude misalignment of the latter.

---

This invention relates in general to certain new and useful improvements in fastening devices and, more particularly, cotters.

Many machine elements are fastened together either securely or in rotatable relation to one another by the use of cotters. The usual construction in which cotters find application involves a shaft or rod which fits through an aperture in a secured part and beyond the secured part the shaft or rod is provided with a transversely extending hole into which the cotter fits.

The simplest form of cotter consists of nothing more than a wedge which is driven into the hole and frictionally engages walls thereof. Such cotters, however, work loose when subjected to vibrations, temperature differentials, and unauthorized forces and, therefore, are somewhat unreliable. Perhaps the most common form of cotter is the cotter pin. Conventional cotter pins are manufactured with heads having split shanks projecting therefrom. The shank fits loosely through the hole until the head engages the walls of the shaft or rod, whereupon the cotter is firmly secured therein by spreading the halves of the split shank outwardly so that the pin cannot be withdrawn from the hole. Cotter pins, however, rotate within the hole and have sharp ends which rip clothing, cut hands, or mar adjacent structures. Moreover, cotter pins must necessarily be made of materials having a low yield strength and consequently do not possess the strength of other fastening devices such as bolts, lock nuts and the like. Furthermore, one must have access to both ends of the hole in order to insert the cotter pin. If one end of the hole is obstructed by a nearby post or other structure, the usefulness of a cotter pin is severely limited.

Among the objects of this invention are the provision of cotters which are not affected by vibrations, temperature differentials, and other unauthorized forces and will, therefore, not work loose; the provision of cotters of the type stated which can be easily and quickly installed in a hole, access to only one end of the hole being necessary; the provision of cotters of the type stated which do not require relatively expensive or specialized tools for installation; the provision of cotters of the type stated which are simple in construction and economical to manufacture. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, FIG. 1 is an exploded perspective view of a cotter constructed in accordance with the present invention;

Corresponding reference characters indicate corresponding parts throughout the drawing.

Figure 1:
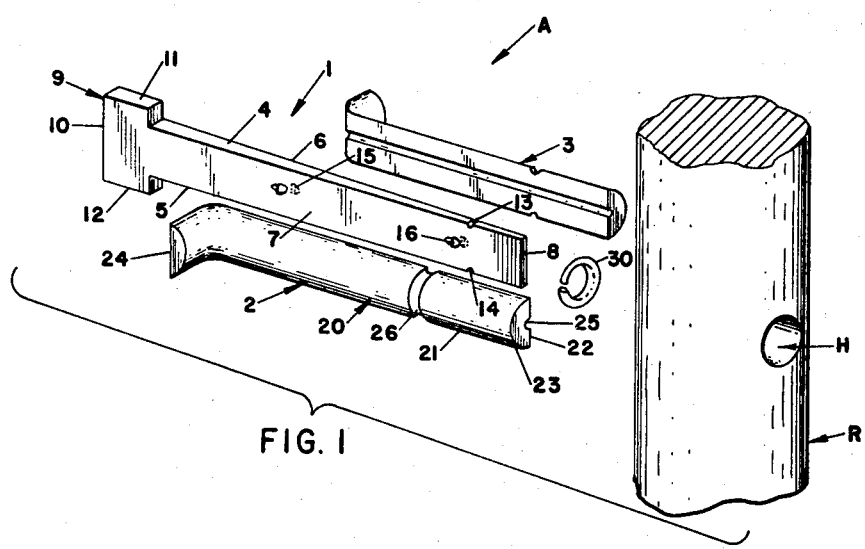
Figure 2:
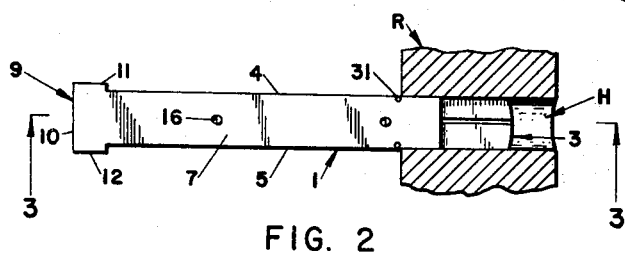
FIG. 2 is a sectional view showing the fastening device partially inserted in a hole.
Figure 3:
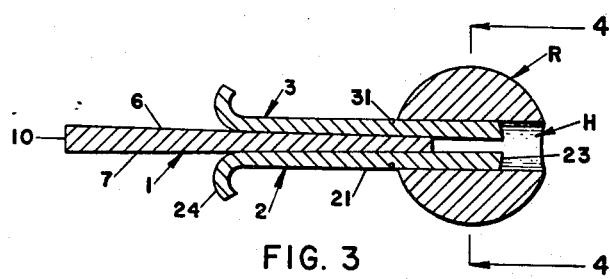
FIG. 3 is a sectional view taken along line 3—3 of FIG. 2.
Figure 4:
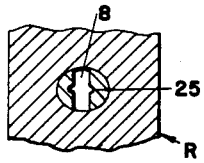
FIG. 4 is a sectional view taken along line 4—4 of FIG. 3.
Figure 5:
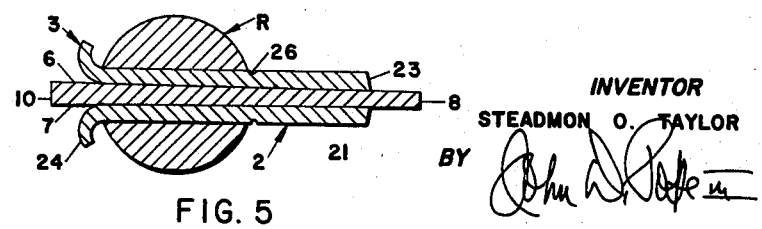
FIG. 5 is a sectional view showing the fastening device fully inserted within the hole.

Referring now in more detail and by reference characters to the drawing, which illustrates a preferred embodiment of the present invention, A designates a cotter including a sliding center wedge 1 which is operatively fitted between cotter halves 2, 3, the entire assembly being adapted for insertion in a cylindrical hole H in a rod-like structure R, as best seen in FIG. 1. The center wedge 1 is of rectangular cross-sectional shape having parallel side faces 4, 5, which are spaced apart a distance slightly less than the diameter of the hole H. Transversely intersecting the side faces 4, 5, are planar wedge-forming faces 6, 7, which taper toward one end of the center wedge 1 in the formation of a wedge point 8. At its other end, the wedge 1 is integrally provided with a head 9 having an end edge 10 and leading edges 11, 12, the latter of which project outwardly from the side faces 4, 5, respectively. Slightly inwardly from the wedge point 8, the side faces 4, 5, are relieved in the provision of opposed notches 13, 14. The wedge face 6 is centrally provided along its longitudinal centerline with nibs 15 and, similarly, the wedge face 7 is centrally provided with nibs 16, all for purposes presently more fully appearing.

Cotter halves 2, 3, are identical in every respect and, therefore, only the cotter half 2 will be described in detail herein. Cotter half 2 includes a shank 20 having an arcuate outer face 21 and a planar inner face 22 which is equal in width to the side faces 4, 5, of center wedge 1, the faces 21, 22, defining a somewhat semi-circular cross-sectional shape. At its one end, the cotter half 2 is ground down in the provision of a beveled leading surface 23 and, at its opposite end, it is bent over away from the inner face 22 in the provision of a shoulder 24, all for purposes presently more fully appearing. Along its longitudinal centerline, the inner face 22 is provided with a groove 25 which is sized to slidably receive the nibs 15, 16. Intermediate its ends, the shank 20 is grooved on its arcuate outer face 22 in the provision of a transversely extending arcuate indentation 26.

Provided for cooperation with center wedge 1 and cotter halves 2, 3, is a C-ring 30 which is formed from spring-steel or some other suitable resilient material and is sized to engage the notches 13, 14, and arcuate indentations 26. C-ring 30 is adapted to bias the cotter halves 2, 3, toward one another, the center wedge 1 being interposed therebetween. More particularly, during the final stages of manufacture the planar inner faces 22 of the cotter halves 2, 3, are brought into facewise abutment with wedge faces 6, 7, respectively, of the center wedge 1. The nibs 15, 16, will thereupon engage the longitudinal grooves 25 of the cotter halves 2, 3, respectively, and prevent the center wedge 1 from sliding transversely with respect to the cotter halves 2, 3. The center wedge 1 is further slipped longitudinally with respect to the shanks 20 until the notches 13, 14, align with the arcuate indentations 26 so as to form a continuous somewhat circular peripheral groove 31 into which the C-ring 30 is fitted.

It should be noted that when the cotter A is in the assembled configuration previously described, the head 9 of the center wedge 1 will be presented substantially beyond the aligned shoulders 24 of the cotter halves 2, 3, or in other words, the wedge 1 is withdrawn, thereby allowing the planar inner faces 22 of the cotter halves 2, 3, to come into close proximity to one another.

Various objects can be secured to a rod-like structure R by the cotter A simply by providing a cylindrical hole H in the structure R, the location of the hole H being, of course, dependent on the nature of the object one desires to secure. The cotter A, while in the assembled configuration, is fitted into the hole H until the shoulders 24 come into abutment with the rod-like structure R at the outer margin of the hole H. Thereafter, the end edge 10 of the center wedge 1 is struck with a hammer and driven forward, thereby forcing the cotter halves 2, 3, apart and into snug engagement with the walls of the hole H. In this connection, it should be noted that the hole H should be diametrally sized so that when the leading edges 11, 12, of the head 9 come into abutment with the structure R between the shoulders 24 of the cotter halves 2, 3, the arcuate outer faces 21 will be in snug frictional engagement with the walls of the hole H, whereby to prevent removal of the cotter A. Additionally, the C-ring 30 will spring out of the notches 13, 14, and in no way interfere with the forward displacement of the center wedge 1. Finally, it should be noted that the beveled leading surfaces 23 will cam the cotter A into the hole H if exact alignment is not obtained upon manual insertion.

Obviously, the cotter A can be tightly installed in the hole H with a minimum amount of manipulation and by using only one tool, namely a conventionaly hammer. Access to only one end of the hole H is necessary. Because the two cotter halves 2, 3, expand directly outwardly into engagement with the walls of the hole H and do not slidably engage it as do some cotters, a much tighter fit is obtained which prevents the cotter A from working loose through the action of vibrations and other unauthorized forces.

Finally, it should be noted that the shank 20 can be provided with any desired contour so as to engage the walls of holes having cross-sectional shapes which are not circular. Moreover, the faces 6, 7, and 22, are described as planar only for convenience of illustration and not by way of limitation. Obviously, such faces could be arcuate, stepped or, for that matter, have any one of a number of matching cross-sectional shapes.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A cotter for holding structures together and adapted for insertion in a hole provided in one or more of the structures, said cotter comprising first and second cotter halves each provided at one of their ends with an outwardly projecting shoulder, a center wedge slidably interposed between the cotter halves and adapted for movement from a preselected withdrawn position wherein the cotter is transversely contracted to an inserted position with respect to the cotter halves, whereby to force the cotter halves apart, and a yieldable band embracing the cotter halves and center wedge for holding the cotter halves and center wedge together in the preselected withdrawn position, the cotter being adapted to fit within the hole when the center wedge is in the withdrawn position.

2. A cotter for holding structures together and adapted for insertion in a hole provided in at least one of the structures; said cotter comprising first and second cotter halves provided with outwardly projecting shoulders and outwardly opening indentations, a center wedge slidably interposed between the cotter halves and adapted for movement from a preselected withdrawn position with respect to the cotter halves wherein the cotter is transversely contracted to an inserted position to force the cotter halves apart, the center wedge being provided on its sides with outwardly opening notches which register with the indentation when the center wedge is in its withdrawn position to form a peripheral groove, and a resilient ring fitted within the peripheral groove so as to hold the center wedge in its preselected withdrawn position between the first and second cotter halves.

3. A cotter for holding two or more structures together and adapted for insertion in a cylindrical bore provided in at least one of the structures; said cotter comprising first and second cotter halves each having shanks provided with arcuate outwardly presented surfaces adapted to frictionally engage the walls of the bore, the shanks being equal in transverse dimension and provided with opposed inwardly presented surfaces having longitudinally extending grooves, shoulder-like protuberances projecting outwardly from the shanks beyond the arcuate outer surfaces, a wedge-like center element slidably interposed between the first and second cotter halves and having its transverse dimension equal to the transverse dimension of the shanks, the center element having first and second forwardly tapered surfaces which conform to the contour of and are in slidable engagement with the inwardly presented surfaces of the first and second cotter halves, respectively, so that as the center element advances inwardly between the first and second cotter halves from a preselected withdrawn position it will urge the shanks apart, at least two axially spaced nibs projecting outwardly from each of the first and second tapered surfaces into engagement with the longitudinally extending grooves so as to prevent transverse displacement between the center element and cotter halves, the shanks and center element being provided with outwardly opening arcuate indentations and notches, respectively, which register when the center element is in the withdrawn position so as to form a substantially circular peripheral groove, and a resilient split ring fitted within the peripheral groove for holding the center element between the first and second cotter halves in the withdrawn position, the transverse distance between the outer extremes of the outer arcuate surfaces being less than the diameter of the cylindrical bore when the center element is in the withdrawn position so that the cotter can be inserted into the bore, whereby, when the center element is driven forwardly between the cotter halves, the first and second cotter halves will move away from one another into frictional engagement with the walls of the bore thereby firmly holding the cotter in the structure having the bore.

4. A cotter according to claim 3 in which the taper surfaces of the center element and the inwardly presented surfaces of the shanks are planar.

5. A cotter according to claim 4 in which the center element is provided with a head, the transverse dimension of which is greater than the diameter of the bore.

References Cited

UNITED STATES PATENTS

| | | | |
|---|---|---|---|
| 735,794 | 8/1903 | Morgan | 85—79 |
| 1,087,759 | 2/1914 | Gould. | |
| 1,435,811 | 11/1922 | Cuntala | 85—86 |
| 2,336,285 | 12/1943 | Olson | 85—8.1 |
| 2,409,180 | 10/1946 | Annett | 85—79 |
| 2,593,790 | 4/1952 | Pietzsch | 85—8.3 |
| 2,965,365 | 12/1960 | Krekeler | 85—8.3 |

FOREIGN PATENTS 981,278  1/1951  France.

MARION PARSONS, JR., *Primary Examiner.*

CARL W. TOMLIN, *Examiner.*